(12) United States Patent
Adamczak et al.

(10) Patent No.: US 11,473,634 B2
(45) Date of Patent: *Oct. 18, 2022

(54) DISK BRAKE PAD WITH OBLIQUELY EXTENDING COLLECTION GROOVE

(71) Applicant: TALLANO TECHNOLOGIE, Boulogne Billancourt (FR)

(72) Inventors: Loïc Adamczak, Montalieu Vercieu (FR); Adrien Maistre, Vincennes (FR)

(73) Assignee: TALLANO TECHNOLOGIE, Boulogne Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/963,154

(22) PCT Filed: Jan. 11, 2019

(86) PCT No.: PCT/FR2019/050063
§ 371 (c)(1),
(2) Date: Jul. 17, 2020

(87) PCT Pub. No.: WO2019/141927
PCT Pub. Date: Jul. 25, 2019

(65) Prior Publication Data
US 2021/0123489 A1    Apr. 29, 2021

(30) Foreign Application Priority Data

Jan. 17, 2018    (FR) ...................... 18 50382

(51) Int. Cl.
*F16D 65/00*    (2006.01)
*B60T 1/06*    (2006.01)
(Continued)

(52) U.S. Cl.
CPC .......... *F16D 65/0031* (2013.01); *B60T 1/065* (2013.01); *F16D 55/22* (2013.01);
(Continued)

(58) Field of Classification Search
CPC ............... F16D 65/0031; F16D 65/092; F16D 2069/004; F16D 55/22; F16D 69/00; F16D 2200/0004; B60T 1/065
See application file for complete search history.

(56) References Cited

U.S. PATENT DOCUMENTS 9,657,797 B2 *   5/2017  Buxton ................... F16D 69/00
2009/0032343 A1   2/2009  Liu et al.
(Continued)

FOREIGN PATENT DOCUMENTS

CA        3038425 A1 *  4/2018
DE        19846887 A1    4/2000
(Continued)

OTHER PUBLICATIONS

International Search Report, dated Apr. 3, 2019, from corresponding PCT application No. PCT/FR2019/050063.
(Continued)

*Primary Examiner* — Pamela Rodriguez
(74) *Attorney, Agent, or Firm* — Nixon & Vanderhye

(57) ABSTRACT

The brake pad for a disk brake includes a lining and a plate. The lining includes:—a friction face and a fastening face;—a rear edge;—an inner edge and an outer edge; and—a collection groove extending into the inner edge or outer edge. The plate has a hole, the hole being connected to a vacuum source via communication element. The lining has a rear region including the rear edge and the collection groove, and a chamfered portion such that an area of a friction surface of the rear region increases when a thickness of the rear region decreases, the collection groove being located at a distance from a free surface of the chamfered portion and having a cross-section which extends obliquely towards the free surface of the chamfered portion.

20 Claims, 3 Drawing Sheets

(51) Int. Cl.
*F16D 55/22* (2006.01)
*F16D 65/092* (2006.01)
*F16D 69/00* (2006.01)

(52) U.S. Cl.
CPC ........... F16D 65/092 (2013.01); F16D 69/00 (2013.01); *F16D 2069/004* (2013.01); *F16D 2200/0004* (2013.01)

(56) References Cited

U.S. PATENT DOCUMENTS

2011/0290599 A1* 12/2011 Vasel ................... F16D 65/092
    188/73.1
2021/0033157 A1* 2/2021 Vyletel ................ F16D 65/0031

FOREIGN PATENT DOCUMENTS

| | | |
|---|---|---|
| FR | 2903748 A1 | 1/2008 |
| FR | 3034831 A1 | 10/2016 |
| GB | 2533476 A * | 6/2016 |

OTHER PUBLICATIONS

Office Action issued in Chinese Patent Application No. 201980010536.2 dated Oct. 15, 2021.

* cited by examiner

DISK BRAKE PAD WITH OBLIQUELY EXTENDING COLLECTION GROOVE

FIELD OF THE INVENTION

The present invention relates to vehicles, in particular automobiles and also railway rolling stock. More specifically, the invention relates to the braking of vehicles and railway rolling stock. The invention further relates to brake pads for disk brake assemblies for said vehicles and said railway rolling stock.

It will be noted that according to the invention, the vehicle may be of any type and may in particular be a car, a lorry or a bus. Similarly, the railway rolling stock may be a train, a tramway or even a tube railway.

TECHNOLOGICAL BACKGROUND OF THE INVENTION

A vehicle or a railway rolling stock generally comprises a braking system. The braking system may in particular be a disk brake system. The braking system then includes a disk integral with a wheel or with an axle of the vehicle or of the railway rolling stock. Thus, when the wheel, or the axle, starts to rotate to make it possible for the vehicle or the railway rolling stock to move, the disk also starts to rotate.

Thus, in order to brake the vehicle or the railway rolling stock, the disk brake system comprises friction means of the disk. The friction means include in particular two plates that each support a lining that comprises a friction material. The friction material is configured to come into contact with the disk. The two plates supporting the friction linings are disposed on either side of the disk so as to squeeze same when the brake system is actuated.

However, when the friction material comes into contact with the disk while said latter is in rotation, the friction material emits particles that are harmful for the environment. Braking systems are therefore pollutants.

This is why, it is known to arrange a device for extracting the particles originating from the braking in the braking system. The extraction device is intended to extract the particles from the braking not long after the emission of said latter.

Nevertheless, the extraction device is mainly adapted to operate when the brake pad is in an "ex-works" configuration. Thus, during the use thereof, the extraction of the braking particles may be less effective.

AIM OF THE INVENTION

One aim of the invention is to provide a brake pad for a disk brake assembly whereof the performances remain constant, or even are improved or at least deteriorate little, over time.

BRIEF SUMMARY OF THE INVENTION

For this, it is provided according to the invention a brake pad for a disk brake assembly, comprising a lining made of friction material and a plate supporting the lining, wherein:
  the lining comprises:
    a friction face and a fastening face,
    a rear edge, located on the side where the disk is capable of coming out of an interface with the pad when the disk rotates in a direction of advance of the vehicle, and a front edge,
    an inner edge and an outer edge, and
    a collection groove open on the friction face and arranged close to the rear edge, the collection groove leading into the inner edge or outer edge,
  the plate includes a hole in fluid communication with the collection groove, the hole being connected to a vacuum source via communication means,
characterised in that the lining includes a rear region comprising the rear edge and the collection groove, the rear region including a chamfered portion such that an area of a friction surface of the rear region increases when a thickness of the rear region decreases, the collection groove being arranged at a distance from a free surface of the chamfered portion and comprising a cross-section which extends obliquely towards the free surface of the chamfered portion.

Thus, as the brake pad wears during the use thereof, the area of the friction surface of the rear region that is disposed between the collection groove and the rear edge of the lining increases. Therefore, braking particles will be emitted rearwards of the vehicle and this, downstream of the collection groove. However, as the cross-section of the collection groove extends obliquely towards the free surface of the chamfered portion, a distance between said free surface and the collection groove increases less, or even remains identical, than if the cross-section of the collection groove extended perpendicular to a plane including the fastening face of the lining. The effectiveness of the collection of braking particles is therefore maintained or slightly impaired, or even improved during the use of the brake pad.

Furthermore, the chamfered portion disposed in the rear region makes it possible to provide a less abrupt contact between the lining and the disk. Thus, the brake pad has better acoustic performances, the noise during the braking being reduced.

In addition, the chamfered portion forms a ramp for the evacuation of water, for example due to rain or originating from thawed frost.

Moreover, it will be noted that "friction surface" means the portion of the friction surface of the lining that is capable of effectively coming into contact with the disk during the braking.

Furthermore, in various embodiments of the invention, one and/or other of the following layouts may also be used:
  the cross-section of the groove forms an angle with a straight line normal to the fastening face between 20° and 80° or between 30° and 60° or preferably between 40° and 50°;
  the cross-section of the groove extends substantially parallel to a section of the free surface of the chamfered portion;
  a distance between the collection groove and the free surface of the chamfered portion is constant along the collection groove;
  the lining includes a rear region including the rear edge, the rear region further comprising a chamfered portion such that an area of a friction surface of the rear region increases when a thickness of the rear region decreases;
  an area of the chamfered portion of the front region and an area of the chamfered portion of the rear region are substantially equal;
  the chamfered portions of the rear region and front region are flat, an angle formed between the chamfered portion of the rear region and a plane comprising the fastening face is substantially equal to an angle formed between the chamfered portion of the rear region and the plane comprising the fastening face;
  the collection groove is hollowed out directly in the friction material, up to the surface of the plate;

the collection groove extends between an open end and a blind end, the hole of the plate leading into the groove close to the blind end.

Furthermore, it is also provided according to the invention a disk brake assembly including a disk and two brake pads such as described above and disposed on either side of the disk.

Finally, it is provided according to the invention a disk brake system that comprises a disk brake assembly such as described above and wherein the disk is integral with an axle or with a wheel.

BRIEF DESCRIPTION OF THE DRAWINGS

It will now be described, by way of non-limiting example, one embodiment of the invention using the following figures.

DETAILED DESCRIPTION OF AN EMBODIMENT OF THE INVENTION

It will be noted that in the interest of clarity, only the elements useful for understanding the embodiments described have been shown and will be described in detail.

Furthermore, unless otherwise specified, the expressions "substantially", "approximately", etc., mean that only a minor variation in relation to the nominal value considered is possible, in particular a low percentage, particularly at about 10%.

Figure 1:
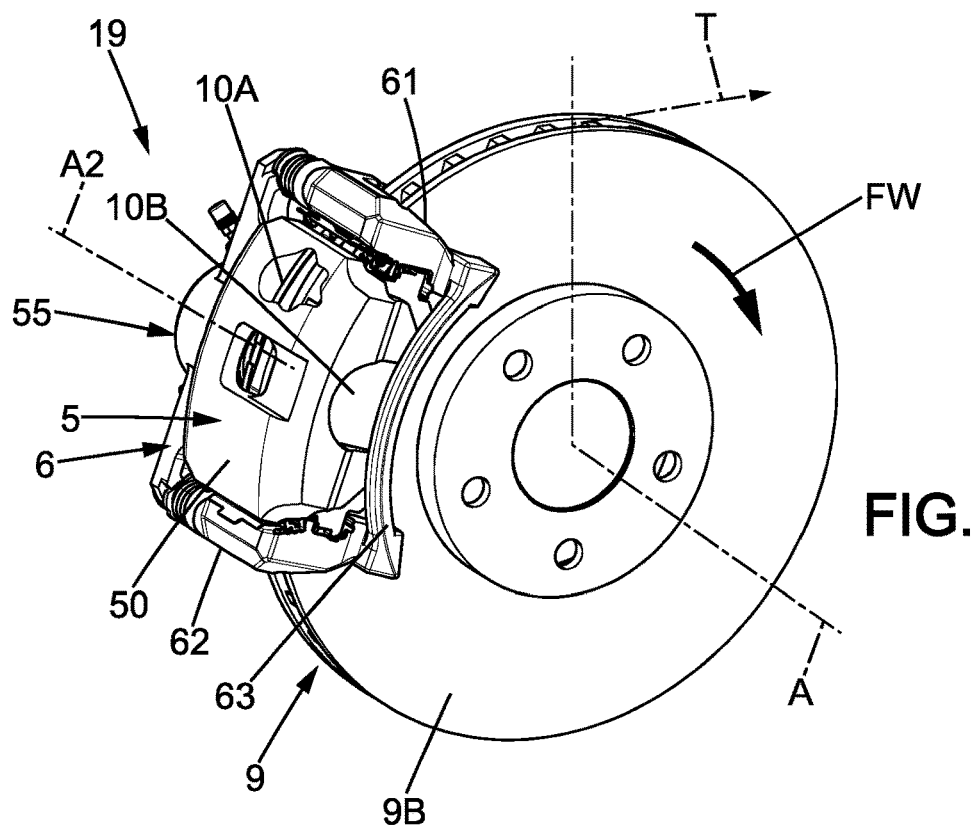
FIG. 1 shows in perspective a disk brake system according to one embodiment of the invention.
Figure 2:
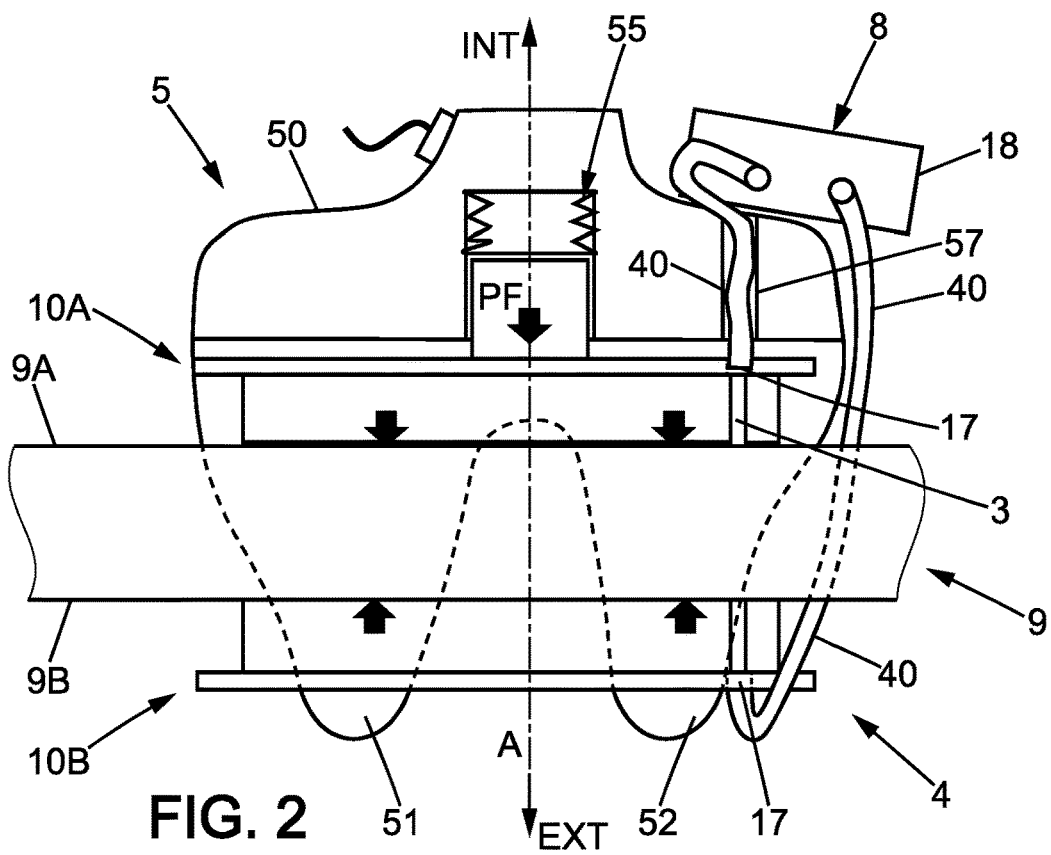
FIG. 2 shows said disk brake system, seen from an axis perpendicular to a main plane of a disk of the disk brake system.

It is shown in FIGS. 1 and 2 a disk brake system 19 according to the invention for a vehicle. In this embodiment, the vehicle is a motor vehicle, in the present case a light vehicle. Nevertheless, it will be noted that the invention may be implemented for any type of vehicle, such as a tractor for semi-trailer, a bus or an agricultural tractor, or for any type of railway rolling stock, such as locomotive or a carriage.

The disk brake system 19 according to the invention includes a disk 9, of axis A integral with a wheel of the vehicle. The disk 9 has a lateral face 9A and an opposite lateral face 9B. The lateral faces 9A, 9B are perpendicular to the axis A. The disk 9 is also connected to a drive mechanism, via in particular a hub, same connected to a motor of the vehicle. Thus, the drive mechanism makes it possible to transmit to the wheel of the vehicle, via the disk 9, a rotational movement about the axis A and this, in order to move the vehicle.

Furthermore, the disk brake system 19 includes a calliper 5 that holds tightly, so as to sandwich, a portion of the disk 9. As illustrated in particular in FIG. 2, the calliper 5 is in the form of a main body 50 that is generally U-shaped so as to hold tightly the disk 9. Furthermore, the main body 50 includes a cavity for accommodating a piston 55. The calliper 5 also includes two fingers 51, 52. The piston 55 is capable of exerting a force PF in a direction A2 identified in FIG. 1 and that is parallel to the axis A of the disk.

In FIG. 1, it is shown a direction of rotation FW of the disk 9 that corresponds to a forward motion of the vehicle. It is also shown a tangential direction T on a circumference of the disk 9.

It is also defined a rear side and an opposite front side. The rear side corresponds to the side where the disk 9 comes out of the interface with the calliper 5 when the disk 9 rotates in the direction of advance of the vehicle. The front side is the opposite side and corresponds to the side where the disk 9 enters into the interface with the calliper 5 when the disk 9 rotates in the direction of advance of the vehicle. In addition, it is defined for a radial direction going from the axis A to the circumference of the disk 9, a direction that goes from the inside to the outside.

The disk brake system 19 comprises a calliper bracket 6 that is fastened to a component of the vehicle. Said component may in particular be a control arm of the vehicle. Furthermore, the calliper bracket 6 comprises two retainer clips 61, 62 disposed at two rear and front longitudinal ends of the calliper 5 and a connection arch 63 that connects the two retainer clips 61, 62. The retainer clip 61 is rear retainer clip and the retainer clip 62 is a front retainer clip.

The disk brake system 19 also includes two brake pads 10A, 10B accommodated in the calliper 5. The two brake pads 10A, 10B are disposed on either side of the disk 9. The brake pad 10A is disposed opposite the lateral face 9A of the disk 9. The brake pad 10B is disposed opposite the lateral face 9B of the disk 9. Thus, the two brake pads 10A, 10B are disposed symmetrically in relation to a plane including the disk 9 and perpendicular to the axis A of the disk 9.

The piston 55 of the calliper 5 is arranged to exert the force PF on the brake pad 10A such that the two pads 10A, 10B come into contact with the disk 9 so as to brake the vehicle when the disk brake system 19 is actuated by a driver of the vehicle. It is noted that in the example illustrated, the calliper 5 is mounted "floating" in the calliper bracket 6, along the axis A. Thus, the calliper 5 may move parallel to the axis A in particular to compensate the progressive wear of the pads 10A, 10B. On the other hand, the calliper 5 is maintained integral with the calliper bracket 6 according to the other potential translations and rotations. The float mounting is usually produced thanks to guide pins sliding along the axis A.

It will now be described in greater detail, the brake pad 10A. By taking into account effects of symmetry, the following description is also valid for the brake pad 10B.

Figure 3:
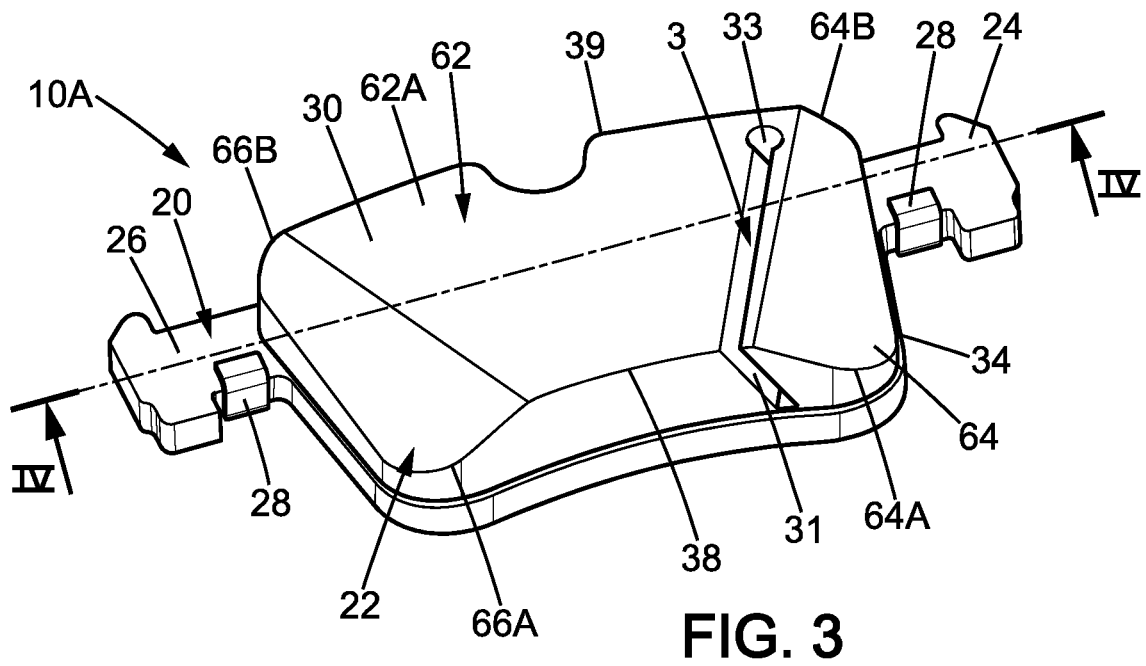
FIG. 3 illustrates in perspective a brake pad of the disk brake system.
Figure 4:
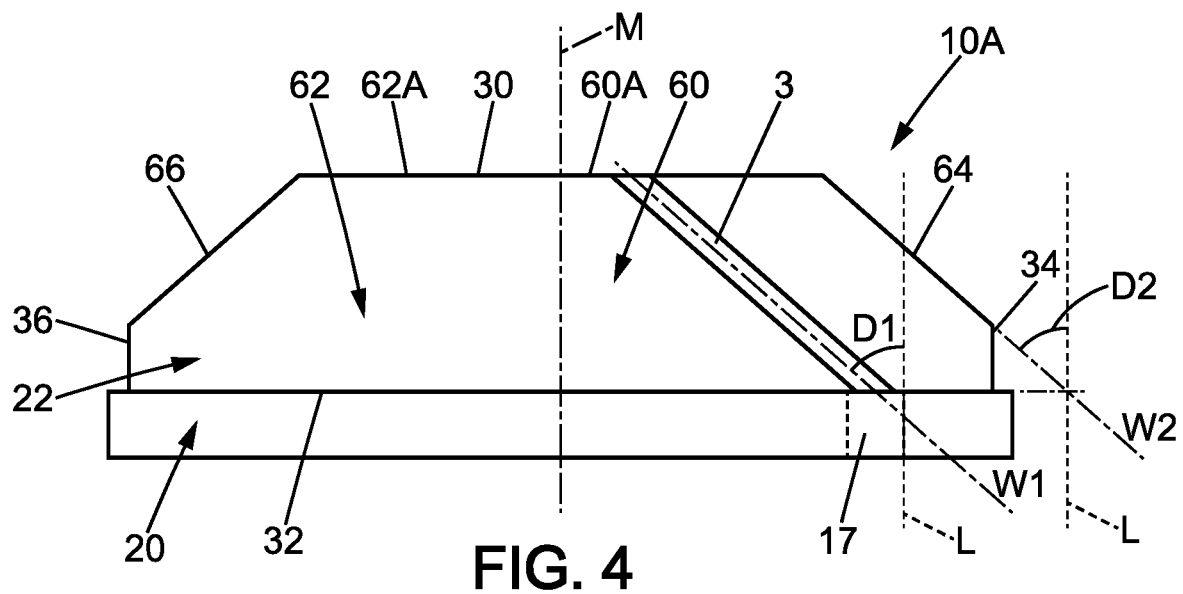
FIG. 4 illustrates in sectional view according to the plane IV-IV identified in FIG. 3, the brake pad.

The pad 10A is in particular illustrated in FIGS. 3 and 4. Thus, the brake pad 10A comprises a plate 20 that supports a friction lining 22. The plate 20 is in the form of a solid metal plate and of substantially constant thickness. The plate 20 includes a rear arm 24 and a front arm 26 that make it possible to fasten the plate 20 to the main body 55 of the calliper 5 by means of hooks 28. The plate 20 includes a fastening face to which is fastened the friction lining 22. The face opposite the fastening face is fastened to the piston 55 as illustrated in FIG. 2.

The friction lining 22 is in the form of a body made of friction material capable of coming into contact with the lateral face 9A of the disk 9 in order to brake the vehicle. The friction material is sometimes called "ferodo". The friction lining 22 therefore includes a friction face 30 intended to come into direct contact with the lateral face 9 of the disk 9. The friction lining 22 also includes a fastening face 32, opposite the friction face 30, and fastened directly to the fastening face of the plate 20. In addition, with reference to the sides previously defined, the friction lining 22 includes a rear edge 34 and an opposite front edge 36. The friction lining 22 also includes an inner edge 38 and an outer edge 39.

When the disk brake system 19 is actuated, the contact between the friction face 30 of the friction lining 22 of the brake pad 10A and the lateral face 9A of the disk 9 generates the emission of polluting braking particles. Said braking particles correspond to particles of the friction material that detach from the friction lining 22 due to abrasion with the lateral face 9A of the disk 9 as well as to particles that detach from the disk 9. This is why, the disk brake system 19 includes braking particle extraction means described below.

The friction lining 22 includes a collection groove 3. The collection groove 3 is open on the friction face 30 and is arranged close to the rear edge 34 of the friction lining 22. Thus, during forward motion of the vehicle, the braking particles are carried towards the collection groove 3, which makes it possible to improve the effectiveness of the collection. When the vehicle is braked while it is in forward motion, the braking particles are emitted towards the front FW, with reference to the forward motion of the vehicle. Thus, the capture of braking particles is all the more effective as the collection groove 3 is disposed close to a rear border of a portion of the friction face 30 that is directly in contact with the lateral face 9A of the disk 9.

As shown in FIG. 2, the collection groove 3 is single, straight and continuous. Same is of constant width. Furthermore, the collection groove 3 is directly hollowed out in the friction material and this, up to the plate 20.

The collection groove 3 further extends between an open end 31 and a blind end 33. The open end 31 is disposed on the inner edge 38 of the friction lining 22. The blind end 33 is disposed close to the outer edge 39. Of course, the open end 31 may also be disposed on the outer edge 39 of the friction lining 22. The blind end 33 may also be disposed on the inner edge 38 of the friction lining 22.

The plate 20 includes a hole 17 that leads into the collection groove 3. The hole 17 is substantially opposite the blind end 33. The hole 17 may more generally be disposed close to the blind end 33. The hole 17 is also in pneumatic communication with the collection groove 3.

In addition, as illustrated in FIG. 2, the disk brake system 19 includes an extraction device 8 in pneumatic communication with the hole 17 by means of a hose 40 that passes through the main body 50 of the calliper 5. The extraction device 8 includes a vacuum source, for example a turbine, and a filter for filtering the air extracted and loaded with braking particles. The vacuum source is configured to extract from the collection groove 3.

Thus, the hole 17 is connected to a vacuum source via communication means that here include the hose 40.

In addition, the friction lining 22 includes a rear region 60 and a front region 62. The rear region 60 includes the rear edge 34 of the friction lining 22 and the collection groove 3. The front region 62 includes the front edge 36. The rear region 60 and the front region 62 are disposed one after the other and are in contact. Same each substantially occupy one half of the friction lining 22. It is shown in FIG. 4, an axis M that delimits the border between the rear region 60 and the front region 62.

The rear region 60 includes a friction surface 60A that is a surface capable of coming directly into contact with the lateral face 9A of the disk 9 when the brake system 19 is actuated. Similarly, the front region 62 includes a friction surface 62A that is a surface capable of coming directly into contact with the lateral face 9A of the disk 9 when the brake system 19 is actuated.

The rear region 60 includes a chamfered portion 64 that connects the friction surface 60A of the rear region 60 and the rear edge 34 of the friction lining 22 such that a thickness of friction lining 22 is greater at a portion that includes the friction surface 60A than at a portion that comprises the rear edge 34. Thus, when the thickness of the rear region 60 decreases, in particular due to the wear caused by the use of the brake pad 10A, an area of the friction surface 60A of the rear region 60 increases.

Similarly, the front region 62 includes a chamfered portion 66 that connects the friction surface 62A of the front region 62 and the front edge 36 of the friction lining 22 such that a thickness of friction lining 22 is greater at a portion that includes the friction surface 62A than at a portion that comprises the front edge 36. Thus, when the thickness of the front region 62 decreases, in particular due to the wear caused by the use of the brake pad 10A, an area of the friction surface 62A of the front region 62 increases.

Therefore, it is understood, in particular using FIG. 3, that the chamfered portions 64, 66 respectively of the rear region 60 and of the front region 62 are not respectively part of the friction surfaces 60A, 62A of the rear region 60 and front region 62.

It will be noted that in the present embodiment, an area of the free surface of the chamfered portion 64 of the rear region 60 and an area of a free surface of the chamfered portion 66 of the front region 62 are substantially equal. Thus, in "ex-works" configuration, the area of the friction surface 60A of the rear region 60 is substantially equal to the area of the friction surface 62A of the front region 62.

According to variants, said two areas may differ. In particular, the area of the free surface of the chamfered portion 66 of the front region 62 may be greater than the area of the free surface of the chamfered portion 64 of the rear region 60. Thus, during the use of the brake pad 10A, the area of the friction surface 62A of the front region 62 will tend to become greater than the area of the friction surface 60A of the rear region 60. Therefore, when the brake system 19 is actuated while the vehicle is in forward motion, more braking particles will be emitted upstream of the collection groove 3 and this towards the collection groove 3. The effectiveness of the capture of braking particles is therefore maintained over time, the effect indicated above compensating the effect of the wear of the braking system 19.

In addition, as illustrated in FIG. 4 in particular, the chamfered portions 64, 66 are flat. The free surface of the chamfered portion 64 thus forms, with a plane that includes the fastening surface 32 of the friction lining 22, an angle that is substantially equal to an angle formed between the free surface of the chamfered portion 66 and the plane that includes the fastening surface 32.

Furthermore, the chamfered portions 64, 66 respectively of the rear region 60 and front region 62 also have the property of making possible a less abrupt contact between the lateral face 9A of the disk 9 and the friction lining 22 when the braking system 19 is actuated. Thus, the noise and the vibrations generated during braking are decreased. Furthermore, the chamfered portions 64, 66 form ramps to evacuate water, for example coming from rain.

In addition, as can be observed in FIG. 3, the chamfered portion 64 of the rear region 60 includes an inner border 64A and an outer border 64B that are respectively partially combined with the lower edge 38 and outer edge 39 of the friction lining 22. The inner border 64A has a length relatively shorter than the outer border 64B.

Similarly, the chamfered portion 66 of the rear region 62 includes an inner border 66A and an outer border 66B that are respectively partially combined with the lower edge 38 and outer edge 39 of the friction lining 22. The inner border 66A has a length relatively shorter than the outer border 66B.

In addition, as can be seen in FIGS. 3 and 4, the collection groove 3 is arranged at a distance from the free surface of the chamfered portion 64 of the rear region 60. The collection groove 3 is disposed at a distance from the free surface of the chamfered portion 64 that is substantially constant along the collection groove 3.

Furthermore, as illustrated in FIG. 4, according to a cross-section, the collection groove 3 extends, from the friction face 30 up to the fastening face of the plate 20, obliquely towards the free surface of the chamfered portion 64.

Figure 5:
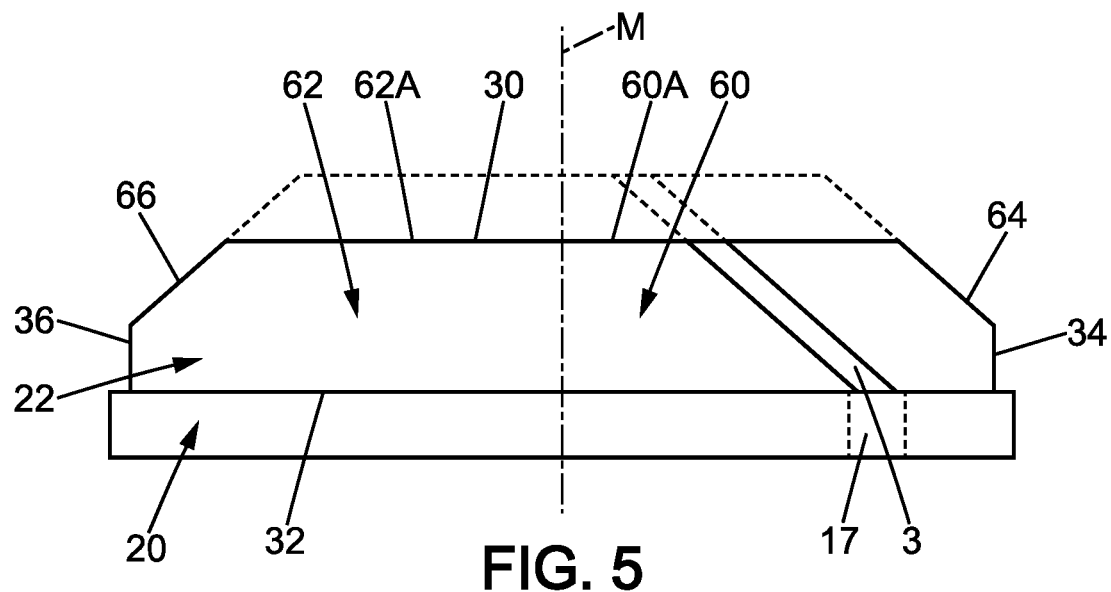
FIG. 5 shows according to said same sectional plane the pad after a certain duration of use leading to a relative wear.

According to the present embodiment, the cross-section of the collection groove 3 extends substantially parallel to the free surface of the chamfered portion 64. Thus, a distance between the collection groove 3 and the free surface of the chamfered portion is constant even when the friction lining 22 has a certain wear as can be seen by comparing FIGS. 4 and 5. Indeed, it is shown in dotted lines in FIG. 5 a portion of the friction lining 22 that disappeared following the wear of the friction lining 22.

The effectiveness of the capture of the braking particles is therefore preserved despite the wear of the friction lining 22.

In addition, it is shown in FIG. 4 an angle D1 corresponding to an angle formed between the cross-section of the collection groove 3 and a straight line L perpendicular to the fastening face 32 of the friction lining 22. Here, the angle D1 is substantially equal to 45°. The angle D1 is more specifically defined between an axis W1 of the collection groove 3 and the axis L.

According to variants, the angle D1 is between 20° and 80° or between 30° and 60° or between 40° and 50°.

It is also shown in FIG. 4 an angle D2 corresponding to an angle formed between a straight line W2 supported by the free surface of the chamfered portion 64 and the straight line L. In the embodiment illustrated in FIG. 4, D1 and D2 are equal.

However, more generally, D1 is strictly greater at 0° and is less than or equal to D2. According to one variant, D1 is strictly greater than D2.

Similarly, an angle formed between the free surface of the chamfered portion 64 of the rear region 60 with a plane that comprises the fastening face 32 of the friction lining 22, and that is therefore normal to the straight line L, is substantially identical to an angle formed between the free surface of the chamfered portion 66 of the front region 62 and said plane comprising the fastening face 32 of the friction lining 22.

Figure 6:
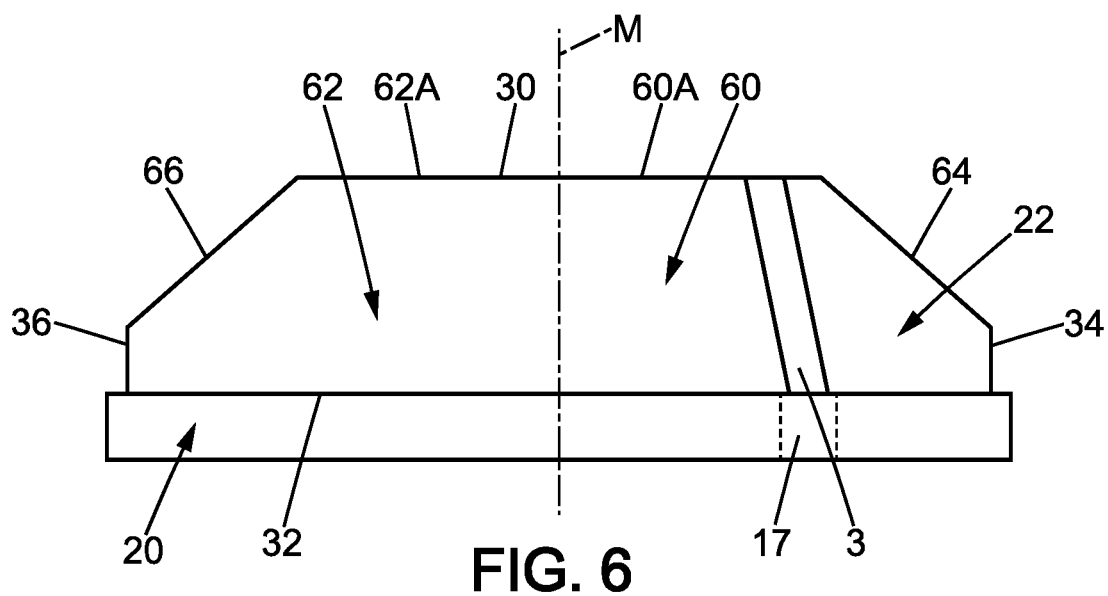
FIG. 6 illustrates according to said same sectional plane a pad according to one variant of the embodiment of the invention.

It is shown in FIG. 6 a variant of the embodiment described above. Only the differences will be indicated.

According to the variant in FIG. 6, the cross-section of the collection groove 3 does not extend substantially parallel to the free surface of the chamfered portion.

Of course, many changes may be made to the invention without departing from the scope thereof.

The angle D1 may also be between 60° and 80° and in particular be substantially equal to 70.

In particular, any type of vacuum source or more generally extraction means may be used.

Also, any type of material may be used for the friction lining 22.

The invention claimed is:

1. A brake pad (10A, 10B) for a disk brake assembly (9), comprising a lining (22) made of friction material and a plate (20) supporting the lining (22), wherein:
the lining (22) comprises:
a friction face (30) and a fastening face (32),
a rear edge (34), located on the side where the disk (9) is capable of coming out of an interface with the pad (10A, 10B) when the disk (9) rotates in a direction of advance of the vehicle, and a front edge (36),
an inner edge (38) and an outer edge (39), and
a collection groove (3) open on the friction face (30) and arranged close to the rear edge (34), the collection groove (3) leading into the inner edge (38) or outer edge (39),
the plate (20) includes a hole (17) in fluid communication with the collection groove (3), the hole (17) being connected to a vacuum source via communication means (40),
wherein the lining (22) includes a rear region (60) comprising the rear edge (34) and the collection groove (3), the rear region (60) including a chamfered portion (64) such that an area of a friction surface (60A) of the rear region (60) increases when a thickness of the rear region (60) decreases, the collection groove (3) being arranged at a distance from a free surface of the chamfered portion (64) and comprising a cross-section which extends obliquely towards the free surface of the chamfered portion (64).

2. The brake pad (10A, 10B) according to claim 1, wherein the cross-section of the groove (3) forms an angle (D1) with a straight line (L) normal to the fastening face (30) between 20° and 80°.

3. The brake pad (10A, 10B) according to claim 2, wherein the cross-section of the groove (3) extends substantially parallel to the free surface of the chamfered portion (64).

4. The brake pad (10A, 10B) according to claim 2, wherein a distance between the groove (3) and the free surface of the chamfered portion (64) is constant along the groove (3).

5. The brake pad (10A, 10B) according to claim 2, wherein the lining (22) includes a front region (62) including the front edge (36), the front region (62) further comprising a chamfered portion (66) such that an area of a friction surface (62A) of the front region (62) increases when a thickness of the front region (62) decreases.

6. The brake pad (10A, 10B) according to claim 2, wherein the collection groove (3) is hollowed out directly in the friction material, up to the surface of the plate (20).

7. The brake pad (10A, 10B) according to claim 1, wherein the cross-section of the groove (3) extends substantially parallel to the free surface of the chamfered portion (64).

8. The brake pad (10A, 10B) according to claim 7, wherein a distance between the groove (3) and the free surface of the chamfered portion (64) is constant along the groove (3).

9. The brake pad (10A, 10B) according to claim 7, wherein the lining (22) includes a front region (62) including the front edge (36), the front region (62) further comprising a chamfered portion (66) such that an area of a friction surface (62A) of the front region (62) increases when a thickness of the front region (62) decreases.

10. The brake pad (10A, 10B) according to claim 1, wherein a distance between the groove (3) and the free surface of the chamfered portion (64) is constant along the groove (3).

11. The brake pad (10A, 10B) according to claim 10, wherein the lining (22) includes a front region (62) including the front edge (36), the front region (62) further comprising a chamfered portion (66) such that an area of a friction surface (62A) of the front region (62) increases when a thickness of the front region (62) decreases.

12. The brake pad (10A, 10B) according to claim 1, wherein the lining (22) includes a front region (62) including the front edge (36), the front region (62) further comprising a chamfered portion (66) such that an area of a friction surface (62A) of the front region (62) increases when a thickness of the front region (62) decreases.

13. The brake pad (10A, 10B) according to claim 12, wherein an area of the free surface of the chamfered portion (64) of the rear region (60) and an area of a free surface of a chamfered portion (66) of the front region (62) are substantially equal.

14. The brake pad (10A, 10B) according to claim 12, wherein the free surfaces of the chamfered portions (64, 66) of the rear region (60) and front region (62) are flat, an angle formed between the free surface of the chamfered portion (64) of the rear region (60) and a plane comprising the fastening face (32) is substantially equal to an angle formed between the free surface of the chamfered portion (66) of the front region (62) and the plane comprising the fastening face (32).

15. The brake pad (10A, 10B) according to claim 1, wherein the collection groove (3) is hollowed out directly in the friction material, up to the surface of the plate (20).

16. The brake pad (10A, 10B) according to claim 1, wherein the collection groove (3) extends between an open end (31) and a blind end (33), the hole (17) of the plate (20) leading into the groove (3) close to the blind end (33).

17. The disk brake assembly including a disk (9) and two brake pads (10A, 10B) according to claim 1 disposed on either side of the disk (9).

18. The disk brake system (19) comprising a disk brake assembly according to claim 17, wherein the disk (9) is integral with an axle or with a wheel.

19. The brake pad (10A, 10B) according to claim 1, wherein the cross-section of the groove (3) forms an angle (D1) with a straight line (L) normal to the fastening face (30) between 30° and 60°.

20. The brake pad (10A, 10B) according to claim 1, wherein the cross-section of the groove (3) forms an angle (D1) with a straight line (L) normal to the fastening face (30) between 40° and 50°.

* * * * *